(12) United States Patent
Kawase et al.

(10) Patent No.: US 7,311,999 B2
(45) Date of Patent: Dec. 25, 2007

(54) ANODE FOR A BATTERY AND A BATTERY USING AN ANODE

(75) Inventors: Kenichi Kawase, Kanagawa (JP); Tomoo Takada, Kanagawa (JP); Yukio Miyaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 387 days.

(21) Appl. No.: 10/716,302

(22) Filed: Nov. 18, 2003

(65) Prior Publication Data
US 2004/0142242 A1 Jul. 22, 2004

(30) Foreign Application Priority Data
Nov. 19, 2002 (JP) .......................... P2002-335052

(51) Int. Cl.
*H01M 4/66* (2006.01)
(52) U.S. Cl. .................................... 429/245; 429/231.1
(58) Field of Classification Search ................ 429/235, 429/233, 236, 245, 231.1, 209, 218.1; 427/126.1, 427/123, 126.3; 204/290.01, 293, 297.01; 428/641
See application file for complete search history.

(56) References Cited

U.S. PATENT DOCUMENTS 6,432,579 B1 * 8/2002 Tsuji et al. .............. 429/218.1
2003/0054249 A1 * 3/2003 Yamamoto et al. ....... 429/231.1
2006/0202882 A1 * 9/2006 Noda et al. .................... 342/1
2006/0205194 A1 * 9/2006 Bauer ......................... 438/542
2006/0205531 A1 * 9/2006 Huang et al. ................ 473/305
2006/0205854 A1 * 9/2006 Xia ............................. 524/439

FOREIGN PATENT DOCUMENTS

| JP | 08-050922 | 2/1996 |
| JP | 11-135115 | 5/1999 |
| JP | 11-339777 | 12/1999 |

* cited by examiner

*Primary Examiner*—Raymond Alejandro
(74) *Attorney, Agent, or Firm*—Bell, Boyd & Lloyd LLP

(57) ABSTRACT

An anode and a battery using same as provided. The battery has a winding electrode body wherein a cathode and an anode are layered and wound with a separator and an electrolyte layer, which hold an electrolyte solution in a holding body therebetween. The anode has an anode collector, an anode active material layer, and a layer including silicon oxide. The anode active material layer includes Si or alloy thereof, is formed by a vapor-phase method, a liquid phase method a sinter method, or the like, and is alloyed with the anode collector on at least a portion of interface between the anode active material layer and the anode collector. The layer includes a silicon oxide that includes silicon dioxide, and has a thickness of about 50 nm or more. Reaction between the anode active material layer and the electrolyte solution at high temperatures is inhibited by the layer including silicon oxide.

13 Claims, 2 Drawing Sheets

ANODE FOR A BATTERY AND A BATTERY USING AN ANODE

CROSS REFERENCE TO RELATED APPLICATIONS

This patent application claims priority to Japanese Patent Document No. P2002-335052 filed on Nov. 19, 2002, the disclosure of which is herein incorporated by reference.

BACKGROUND OF THE INVENTION

The present invention generally relates to an anode. More specifically, the present invention relates to an anode having an anode collector and an anode active material layer, and a battery using the anode.

In recent years, in connection with high-performance and multi-function of mobile devices, high capacities of secondary batteries, the power source for the mobile devices have been desired earnestly. As a secondary battery which meets this demand, there is known a lithium secondary battery. However, in the case of using cobalt acid lithium for a cathode and graphite for an anode, which is currently a typical form for lithium secondary batteries, a battery capacity is in a saturated state, and it is extremely difficult to greatly obtain a high capacity of the battery. Therefore, from prior times, using metal lithium (Li) for an anode has been considered. However, in order to put this anode to practical use, it is necessary to improve efficiency of precipitation dissolution of lithium and to control dendrite precipitation form.

Meanwhile, a high capacity anode using silicon (Si), tin (Sn) or the like has been actively considered. However, when charge and discharge are repeated, these anodes are pulverized and miniaturized due to significant expansion and shrinkage of an anode active material, collecting characteristics are lowered, and decomposition reaction of an electrolyte solution is facilitated due to an increased superficial area, so that their cycle characteristics are extremely poor. Therefore, an anode wherein an anode active material layer is formed on an anode collector by vapor-phase method, liquid phase method, sinter method and the like has been considered (for example, refer to Japanese Unexamined Patent Application Publication No. H08-50922, Japanese Patent No. 2948205, and Japanese Unexamined Patent Application Publication No. H11-135115). According to this anode, since miniaturization can be inhibited compared to conventional application type anodes wherein slurry containing a particulate anode active material and a binder is applied, and the anode collector and the anode active material layer can be integrated, so that electronic conductivity in the anode becomes extremely excellent, and high performance in terms of capacity and cycle life is expected. In addition, a conductive material, a binder, and voids which have existed in the anode conventionally can be reduced or excluded. Therefore, the anode can become a thin film essentially.

However, there has been a problem that, as the application type anode do, the anode wherein the anode active material layer is formed on the anode collector by vapor-phase method, liquid phase method, or sinter method reacts to an electrolyte, rise of internal resistance and lowering of capacity of the battery, after being held at high temperatures.

SUMMARY OF THE INVENTION

The invention has been achieved in consideration of such problems as discussed above. In general, the present invention provides an anode to provide superior hot holding characteristics, and a battery using it.

A first anode according to an embodiment of the present invention includes an anode collector; an anode active material layer which is provided on the anode collector and which is alloyed with the anode collector on at least part of interface between the anode active material layer and the anode collector; and a layer including silicon oxide having a thickness of 50 nm or more which is provided on the anode active material layer.

A second anode according to the invention includes an anode collector; an anode active material layer which is formed on the anode collector by at least one method such as a of vapor-phase method, liquid phase method, and sinter method and the like; and a layer including silicon oxide having a thickness of about 50 nm or more which is provided on the anode active material layer.

A first battery according to an embodiment of the present invention includes a cathode, an anode, and an electrolyte. The anode includes an anode collector, an anode active material layer which is provided on the anode collector and which is alloyed with the anode collector on at least part of interface between the anode active material layer and the anode collector, and a layer including silicon oxide having a thickness of about 50 nm or more which is provided on the anode active material layer.

A second battery according to an embodiment of the present invention includes a cathode, an anode and an electrolyte. The anode includes an anode collector, an anode active material layer which is formed on the anode collector by at least one method form the group consisting of vapor-phase method, liquid phase method, and sinter method, and a layer including silicon oxide having a thickness of about 50 nm or more which is provided on the anode active material layer.

In the first and second anodes according to an embodiment of the present invention, since the layer including silicon oxide having a thickness of about 50 nm or more is provided, reaction between the anode active material layer and an electrolyte at high temperatures is inhibited.

In the first and the second batteries according to an embodiment of the present invention, since the anodes of the invention are used, reaction between the anode active material layer and an electrolyte at high temperatures is inhibited. Therefore, superior hot holding characteristics can be obtained.

Additional features and advantages of the present invention are described in, and will be apparent from, the following Detailed Description of the Invention and the figures.

DETAILED DESCRIPTION OF THE INVENTION

The present invention generally relates to anodes. More specifically, the present invention relates to an anode that has an anode collector and an anode active material layer, and a battery using the anode.

Figure 1:
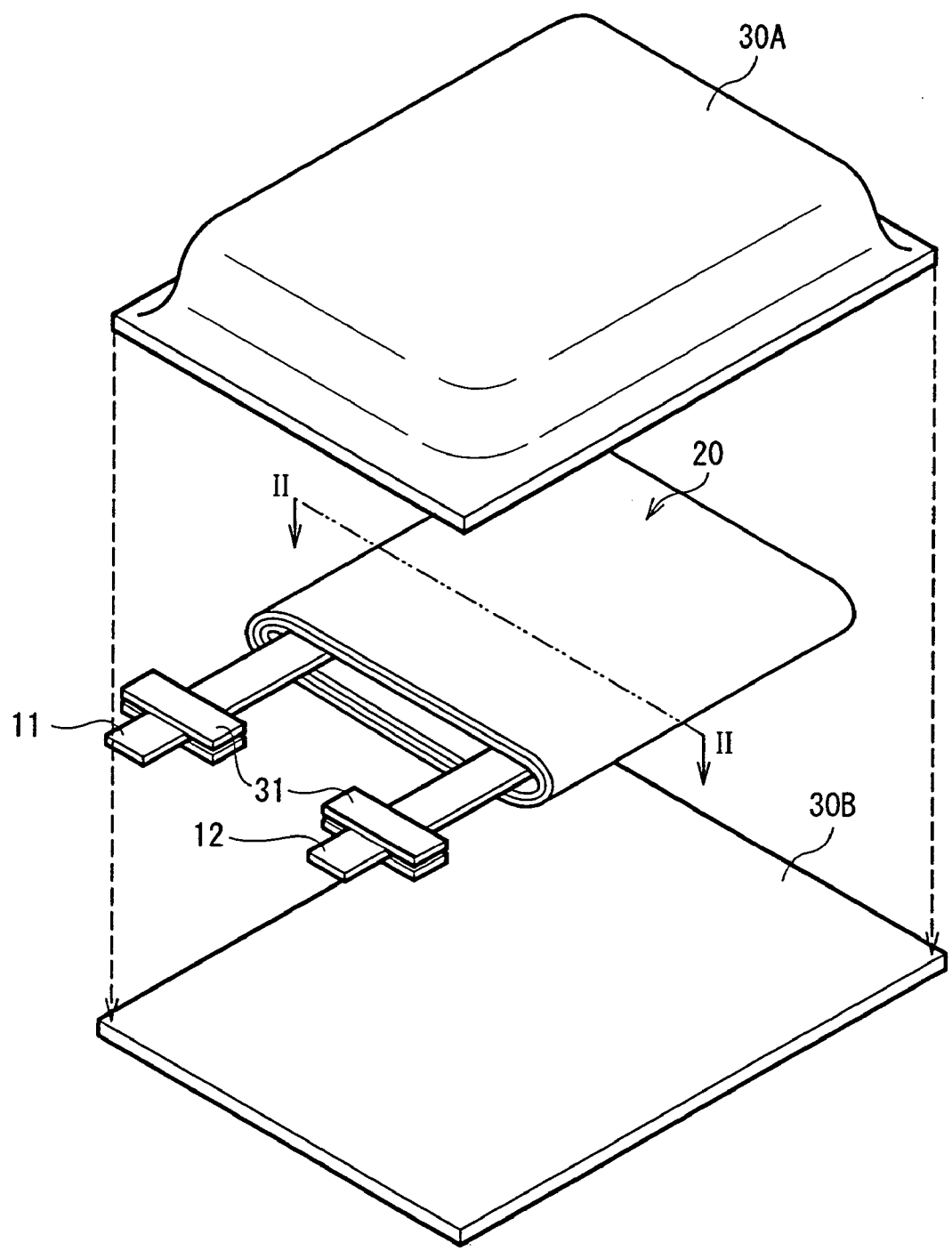
FIG. 1 is an exploded perspective view showing a construction of a secondary battery according to an embodiment of the present invention.

FIG. 1 shows an exploded view showing a construction of a secondary battery according to an embodiment of the present invention. This secondary battery is a secondary battery wherein an electrode winding body 20 to which a cathode lead 11 and an anode lead 12 are attached is housed inside of film exterior members 30A and 30B, and its size, weight and thickness can be reduced.

The cathode lead 11 and the anode lead 12 are respectively attached to ends of a cathode collector 21A and an anode collector 22A described later in longitudinal direction. The cathode lead 11 and the anode lead 12 are directed from inside of the exterior members 30A and 30B to outside, and, for example, are derived in the same direction. The cathode lead 11 and the anode lead 12 are respectively made of a metal material such as aluminum (Al), copper (Cu), nickel (Ni), stainless, and/or the like and are respectively in the shape of a thin plate, in the shape of a net or the like.

The exterior members 30A and 30B are made of aluminum laminated films in the shape of rectangle, wherein, for example, a nylon film, an aluminum foil, and a polyethylene film are bonded together in this order. Additional and other suitable materials may be utilized. The exterior members 30A and 30B are, for example, arranged so that a polyethylene film side and the electrode winding body 20 are placed opposite, and respective outer edge parts are pressed against each other by anastomoses, an adhesive or the like. Adhesive films 31 to protect from outside air intrusion are inserted between the exterior members 30A, 30B, and the cathode lead 11, the anode lead 12. The adhesive films 31 are made of a material having contact characteristics to the cathode lead 11 and the anode lead 12, for example a polyolefin resin, such as polyethylene, polypropylene, modified polyethylene, modified polypropylene, and the like.

The exterior members 30A and 30B can be made of laminated films having other structures, polymer films such as polypropylene, or metal films, instead of the foregoing aluminum laminated film.

Figure 2:
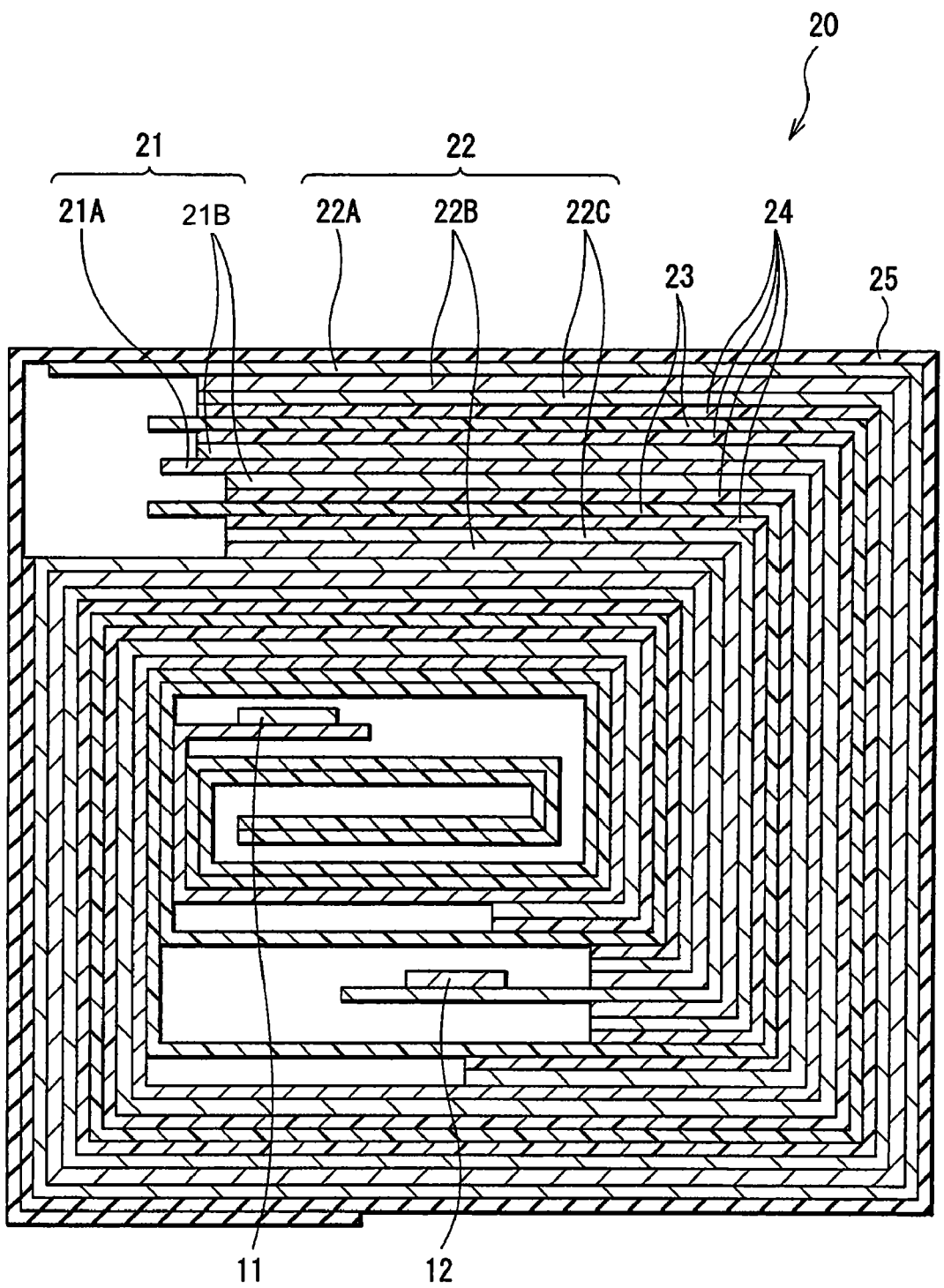
FIG. 2 is a cross sectional view showing a construction taken along line II-II of an electrode winding body illustrated in FIG. 1.

FIG. 2 is a view showing a cross sectional structure taken along line II-II of the electrode winding body 20 illustrated in FIG. 1. In the electrode winding body 20, a cathode 21 and an anode 22 are layered and wound with a separator 23 and an electrolyte layer 24 in between, and an outermost part is protected by a protective tape 25.

The cathode 21 has, for example, the cathode collector 21A, and a cathode active material layer 21B provided on the cathode collector 21A. The cathode active material layer 21B can be formed on both sides or one side of the cathode collector 21A. The cathode collector 21A is made of, for example, aluminum, nickel, stainless or the like including combinations thereof.

The cathode active material layer 21B contain, for example, one or two kinds of cathode materials which can insert and extract lithium as a cathode active material, and can contain a conductive material such as carbon materials, and a binder such as polyvinylidene fluoride as necessary. As a cathode material which can insert and extract lithium, for example, metal complex oxides including lithium expressed as a general formula of $Li_xMIO_2$ are preferable. Since the metal complex oxides including lithium can generate high voltage and their densities are high, further high capacity of the secondary battery can be obtained. MI means one or more transition metals, and, MI is preferably, for example, at least one of cobalt (Co), nickel and the like. x differs due to charge and discharge conditions of the battery, and normally is a value in the range of $0.05 \leq x \leq 1.10$. Examples of such metal complex oxides including lithium include $LiCoO_2$, $LiNiO_2$ and the like are illustrative of the present invention according to an embodiment.

The anode 22 has, for example, the anode collector 22A, an anode active material layer 22B provided on the anode collector 22A, and a layer including silicon oxide 22C provided on the anode active material layer 22B. The anode collector 22A, the anode active material layer 22B, and the layer including silicon oxide 22C are layered in this order, and the layer including silicon oxide 22C side is placed opposing to the cathode active material layer 21B of the cathode 21. The anode active material layer 22B and the layer including silicon oxide 22C can be formed on both sides or one side of the anode collector 22A.

It is preferable that the anode collector 22A in an embodiment is made of, for example, copper (Cu), stainless, nickel, titanium (Ti), tungsten (W), molybdenum (Mo), aluminum or the like, and specially, in some cases, it is more preferable that the anode collector 22A is made of a metal which is easily alloyed with the anode active material layer 22B. For example, as described later, in the case where the anode active material layer 22B includes at least one type of a simple substance and compounds of, for example, silicon, copper, titanium, aluminum, nickel and the like can be cited as a material which is easily alloyed. Though the anode collector 22A can be composed of a monolayer, it is also possible that the anode collector 22A is composed of several layers. In this case, it is possible that a layer adjacent to the anode active material layer 22B is made of a metal material which is easily alloyed with the anode active material layer 22B, and other layers are made of other metal materials.

The anode active material layer 22B is, for example, formed by at least one method that includes, for example, a vapor-phase method, a liquid phase method, and a sinter method, and include an anode active material. In result, it is possible to inhibit breakage due to expansion or shrinkage of the anode active material layer 22B involved in charge and discharge, to integrate the anode collector 22A and the anode active material layer 22B, and to improve electronic conductivity in the anode 22. In addition, differing from conventional application type anodes, a binder, voids and the like can be reduced or excluded, so that the anode can become a thin film. The anode active material layer 22B is preferably alloyed with the anode collector 22A on at least part of interface between the anode active material layer 22B and the anode collector 22A. Specifically, it is preferable that on the interface, a component element of the anode collector 22A diffuses into the anode active material layer 22B, or a component element of the anode active material diffuses into the anode collector 22A, or both of them diffuse into each other. This alloying often coincides with forming the anode active material layer 22B by, for example, vapor-phase method, liquid phase method, sinter method or the like. However, the alloying can be generated by applying further heat treatment. In this specification, diffusion of the foregoing elements is included in the alloying as one form.

As an anode active material, it is preferable that at least one type of a simple substance and compounds of silicon is included in an embodiment. A simple substance and compounds of silicon can form an alloy with lithium and the like, and have large capacity to insert and extract lithium. Depending on their combinations, it is possible that energy density of the anode 22 is raised compared to conventional carbon, and the layer including silicon oxide 22C is easily formed by air oxidation and the like. Compounds of silicon include, for example, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v \leq 2$), $LiSiO$, and the like.

As an anode active material, at least one type of simple substances and compounds of, for example, tin, germanium (Ge), carbon (C) and the like can be further included. However, it is preferable that 50% or more of a capacity due to insertion or extraction of lithium of the anode 22 is due to reaction of a simple substance or compounds of silicon.

The layer including silicon oxide 22C includes silicon dioxide in an embodiment. The layer including silicon oxide 22C is intended to inhibit reaction between the anode active material layer 22B and an electrolyte solution described later at high temperatures, and to prevent rise of internal resistance and lowering of capacity of the battery. It is acceptable that the layer including silicon oxide 22C is provided on at least part of surface of the anode active material layer 22B, and it is not necessary to provide the layer including silicon oxide 22C on a whole face of the anode active material layer 22B. For example, the layer including silicon oxide 22C can be provided in the island shape, and openings to expose the anode active material layer 22B can be included. A thickness of the layer including silicon oxide 22C is preferably about 50 nm or more, since reaction between the anode active material layer 22B and the electrolyte solution at higher temperatures such as 80° C. or more can be inhibited. Silicon oxide can be silicon dioxide ($SiO_2$), silicon monoxide (SiO), non-stoichiometric composition and the like, however, including silicon dioxide ($SiO_2$) is specially preferable. Since silicon monoxide inserts and extracts lithium, it easily falls away from the surface of the anode active material layer 22B due to expansion and shrinkage involved in charge and discharge, though silicon dioxide is at low risk of the above event. Not only the layer including silicon oxide 22C, but also the anode active material layer 22B can include silicon oxide. However, it is preferable that a concentration of silicon oxide in the layer including silicon oxide 22C is higher than that in the anode active material layer 22B.

The separator 23 is intended to separate the cathode 21 and the anode 22, to protect current short circuit due to contact between the cathode 21 and the anode 22, and to put lithium ions through. The separator 23 is made of, for example, polyethylene, polypropylene and the like.

The electrolyte layer 24 is made of so-called gel electrolyte, wherein an electrolyte solution is dispersed or held in a holding body. The gel electrolyte is preferable since the gel electrolyte can prevent liquid leakage of the battery or expansion at high temperatures. The holding body is made of, for example, a polymeric material. Such a polymeric material includes, for example, polyvinylidene fluoride, the block copolymer and the like.

In an embodiment, the electrolyte solution contains, for example, a solvent and a lithium salt which is an electrolytic salt dissolved in this solvent. An additive can be also contained as necessary. As a solvent, for example, organic solvents such as ethylene carbonate, propylene carbonate, dimethyl carbonate, diethyl carbonate, ethyl methyl carbonate and the like can be utilized. One of them, or mixture of two or more of them can be used.

As a lithium salt, for example, $LiPF_6$, $LiClO_4$, $LiCF_3SO_3$, and the like can be employed. One of them, or mixture of two or more of them can be used.

The secondary battery having the foregoing construction can be, for example, manufactured as follows according to an embodiment.

First, for example, a cathode active material, a conductive material, and a binder are mixed to prepare a cathode mixture, which is dispersed in a dispersion medium such as N-methyl pyrrolidone to thereby obtain a cathode mixture slurry. This cathode mixture slurry is applied to both sides or one side of the cathode collector 21A, dried and compression-molded. Consequently, the cathode active material layer 21B is formed, and the cathode 21 is fabricated.

Subsequently, by using vapor-phase method and liquid phase method, the anode active material layer 22B is formed by depositing an anode active material, for example, at least one kind from the group consisting of a single substance and compounds of silicon, onto the anode collector 22A. It is possible that, after forming a precursor layer containing a particulate anode active material on the anode collector 22A, the anode active material layer 22B is formed by sinter method to sinter the precursor layer. It is also possible that the anode active material layer 22B is formed by combining two or three methods from vapor-phase method, liquid phase method and sinter method. In this way, by forming the anode active material layer 22B by using at least one method from the group consisting of vapor-phase method, liquid phase method and sinter method, in some cases, the anode active material layer 22B which is alloyed with the anode collector 22A are formed on at least part of interface between the anode active material layer 22B and the anode collector 22A. In order to further alloy the interface between the anode collector 22A and the anode active material layer 22B, it is possible to apply heat treatment further under vacuum atmosphere or non-oxidizing atmosphere. In particular, when the anode active material layer 22B is formed by plating described later, the anode active material layer 22B may be hard to be alloyed even on the interface between the anode collector 22A and the anode active material layer 22B, it is preferable to apply this heat treatment as necessary. Further, when the anode active material layer 22B is formed by vapor-phase method, it is also preferable to apply this heat treatment as necessary, since characteristics may be improved by further alloying the interface between the anode collector 22A and the anode active material layer 22B.

As vapor-phase method, physical deposition method or chemical deposition method can be used according to types of anode active materials. Specifically, vacuum deposition method, sputter method, ion plating method, laser ablation method, heat CVD (chemical vapor deposition) method, plasma CVD method and the like can be utilized. As liquid phase method, known techniques such as electrolytic plating, non-electrolytic plating and the like can be utilized. For sinter method, known techniques can be utilized as well, for example, atmosphere sinter method, reaction sinter method, or hot press sinter method can be utilized.

After forming the anode active material layer 22B, the layer including silicon oxide 22C made of silicon oxide such as silicon dioxide are formed on the anode active material layer 22B by deposition method, sputter method and the like, and the anode 22 is fabricated. Alternatively, it is possible that the layer including silicon oxide 22C is formed by oxidizing the anode active material layer 22B in the atmosphere containing oxygen, or by generating electrochemical reaction between the anode active material layer 22B and an electrolyte solution.

Subsequently, for example, after forming the electrolyte layer 24 wherein an electrolyte solution is held in the holding body, on the cathode 21 and the anode 22 respectively, the cathode lead 11 is attached to the cathode collector 21A by welding, and the anode lead 12 is attached to the anode collector 22A by welding.

Subsequently, after making a lamination by layering the cathode 21 and the anode 22 to which electrolyte layers 24 are formed, with the separator 23 in between, this lamination is wound in its longitudinal direction, the protective tape 25 is bonded to the outermost circumferential part to form the electrode winding body 20.

Finally, for example, the electrode winding body 20 is sandwiched between the exterior members 30A and 30B, and the electrode winding body 20 is enclosed by contacting outer edges of the exterior members 30A and 30B by heat anastomoses or the like. Then, the adhesive films 31 are inserted between the cathode lead 11, the anode lead 12 and the exterior members 30A, 30B. Consequently, the secondary battery shown in FIGS. 1 and 2 is completed according to an embodiment.

This secondary battery acts as follows according to an embodiment.

In this secondary battery, when charged, lithium ions extract from the cathode 21, and those lithium ions are inserted into the anode 22 through the electrolyte solution. When discharged, for example, lithium ions extract from the anode 22, and those lithium ions are inserted into the cathode 21 through the electrolyte solution. Here, since the layer including silicon oxide 22C having a thickness of about 50 nm or more is provided on the anode active material layer 22B, reaction between the anode active material layer 22B and the electrolyte solution can be inhibited even when being held at high temperatures.

As above, in this embodiment, the layer including silicon oxide 22C having a thickness of about 50 nm or more is provided on the anode active material layer 22B on the side opposing to the cathode 21. Therefore, reaction between the anode active material layer 22B and the electrolyte solution can be inhibited at high temperatures, and rise of internal resistance and lowering of capacity of the battery can be prevented. Namely, superior hot holding characteristics can be obtained.

By way of example, and not limitation, the present invention will be described below according to an embodiment of the present invention.

Further, descriptions about concrete examples of an embodiment the invention will be made with reference to FIGS. 1 and 2 by using the same symbols.

As Examples 1 to 3, first, powders of cobalt acid lithium (LiCoO$_2$) which was a cathode active material having an average particle diameter of 5 µm; carbon black which was a conductive material; and polyvinylidene fluoride which was a binder were mixed by a mass ratio of cobalt acid lithium:carbon black: polyvinylidene fluoride=92:3:5, which was put into N-methyl pyrrolidone which was a dispersion medium to thereby obtain a cathode mixture slurry. This cathode mixture slurry was applied to the cathode collector 21A made of aluminum having a thickness of 20 µm, dried, and pressurized. Consequently, the cathode active material layer 21B was formed, and the cathode 21 was fabricated.

After forming the anode active material layer 22B having a thickness of 3.0 µm made of amorphous silicon on the anode collector 22A having a thickness of 25 µm made of an electrolytic copper foil by vacuum deposition method, the layer including silicon oxide 22C made of silicon oxide was formed on the anode active material layer 22B by RF sputter method, and the anode 22 was fabricated. Then, thicknesses of the layer including silicon oxide 22C in Examples 1 to 3 were varied as shown in Table 1. When the obtained anode 22 was analyzed by XPS (X-ray photoelectron spectroscopy) and AFS (auger electron spectroscopy), it was confirmed that the anode active material layer 22B was alloyed with an anode collector 22A on at least part of interface between the anode active material layer 22B and the anode collector 22A.

TABLE 1

| | Construction of anode | | Maintenance ratio of discharge capacity after hot holding (%) | | |
|---|---|---|---|---|---|
| | Anode active material layer | Thickness of layer including silicon oxide (nm) | 40° C. | 60° C. | 80° C. |
| Example 1 | Si deposition | 50 | 92 | 85 | 77 |
| Example 2 | Si deposition | 100 | 94 | 90 | 88 |
| Example 3 | Si deposition | 300 | 93 | 90 | 89 |
| Comparative example 1 | Si deposition | 0 | 92 | 82 | 75 |
| Comparative example 2 | Si deposition | 30 | 92 | 83 | 73 |
| Comparative example 3 | Si application | 100 | 89 | 74 | 65 |
| Comparative example 4 | Si application | 0 | 88 | 75 | 64 |

Subsequently, a precursor solution wherein polyvinylidene fluoride of 10 wt %, the block copolymer having its weight average molecular mass of 0.6 million, and dimethyl carbonate of 60 wt %, the solvent for polymeric materials are mixed and dissolved into an electrolyte solution of 30 wt % comprised of ethylene carbonate of 42.5 wt %, propylene carbonate of 42.5 wt %, and LiPF$_6$, the lithium salt of 15 wt % was applied to the cathode 21 and the anode 22 respectively. The resultant was left for 8 hours at normal temperatures, and dimethyl carbonate was volatilized. The electrolyte layer 24 was therefrom formed on the cathode 21 and the anode 22, respectively.

Subsequently, the cathode 21 and the anode 22 were cut in the strip shape, the cathode lead 11 was attached to the cathode 21, and the anode lead 12 was attached to the anode 22. After that, a lamination was formed by layering the cathode 21 and the anode 22 to which electrolyte layer 24 were formed. The electrode winding body 20 was formed by winding this lamination.

Finally, this electrode winding body 20 was sandwiched between the exterior members 30A and 30B made of aluminum laminated films, and the electrode winding body 20 was enclosed by heat anastomoses under a reduced pressure. Then, the adhesive films 31 made of a resin were inserted between the cathode lead 11, the anode lead 12 and the exterior members 30A, 30B. Consequently, the secondary battery shown in FIGS. 1 and 2 was obtained.

Regarding the obtained secondary batteries of Examples 1 to 3, their hot holding characteristics were examined. First, constant current charge was applied with a constant current density of 1 mA/cm$^2$ until battery voltage reached 4.2 V. After that, constant voltage charge was applied with a constant voltage of 4.2 V until current density reached 0.02 mA/cm$^2$. Then, based on the charge and discharge capacities of the cathode 21 and the anode 22 which were preliminary obtained by calculation, cathode utilization ratio was set to 90% to prohibit precipitation of metal lithium. After that, constant current discharge was applied with a constant current density of 1 mA/cm$^2$ until battery voltage reached 2.5 V, and a discharge capacity before hot holding was measured. After applying 1 cycle charge and discharge, constant current charge was applied under the conditions similar to those in the first circle. Subsequently, after being held in the oven at 40° C., 60° C., or 80° C. for 7 days, constant current discharge was applied with a constant current density of 1 mA/cm$^2$ until battery voltage reached 2.5 V, and discharge capacity after hot-holding was measured. Further, as a maintenance ratio of discharge capacity after hot holding (%), a ratio of discharge capacity after hot holding in relation to a discharge capacity before hot holding was calculated. Obtained results are shown in Table 1. Both the charge and the discharge were applied at 25° C.

As Comparative examples 1 and 2 in relation to Examples 1 to 3, secondary batteries were fabricated in a manner similar to in Example 1, except that thicknesses of the layers including silicon oxide were varied as shown in Table 1. In addition, as Comparative examples 3 and 4 in relation to Examples 1 to 3, secondary batteries were fabricated in a manner similar to in Examples 1 to 3, except that the secondary batteries were formed by applying the anode active material layer and thicknesses of the layers including silicon oxide were varied as shown in Table 1. Then, 70 wt % of silicon powder, the anode active material having an average particle diameter of 1 µm; 3 wt % of acetylene black and 20 wt % of squamation artificial graphite having an average particle diameter of 5 µm, which were anode active materials and the conductive materials; and 7 wt % of polyvinylidene fluoride, the binder were mixed, the resultant was put into N-methyl pyrrolidone, the dispersion medium to obtain an anode mixture slurry. This slurry was applied to the anode collector, dried, and pressurized. Consequently, the anode active material layer was formed. Regarding secondary batteries in Comparative examples 1 to 4, their hot holding characteristics were also examined in a manner similar to in Examples 1 to 3. These results are also shown in Table 1.

As evidenced by Table 1, regarding maintenance ratio of discharge capacity after hot holding, higher values were obtained in Examples 1 to 3 wherein thickness of the layer including silicon oxide 22C was 50 nm or more, compared to in Comparative examples 1 and 2 wherein thickness of the layer including silicon oxide 22C was under 50 nm. On the contrary, in Comparative examples 3 and 4 wherein the anode active material layer was formed by application, there was almost no deference regarding maintenance ratio of discharge capacity after hot holding, between Comparative example 3 having the layer including silicon oxide with a thickness of 100 nm and Comparative example 4 wherein no layer including silicon oxide exists. Namely, it was found that when the layer including silicon oxide 22C having a thickness of 50 nm or more was provided on the anode active material layer 22B, hot holding characteristics could be improved.

In the foregoing Examples, the anode active material layer 22B was formed by vacuum deposition method. However, similar results can be obtained by forming the anode active material layer 22B by other vapor-phase method. Further, similar results can be also obtained by forming the anode active material layer 22B by liquid phase method or sinter method.

While the invention has been described with reference to the embodiment and Examples, the invention is not limited to the foregoing embodiment and Examples, and various modifications may be made. For example, though in the foregoing embodiment and Examples, the case using so-called gel electrolyte has been described, other electrolyte can be used. As other electrolyte, an electrolyte solution which is a liquid electrolyte, a solid electrolyte having ion conductivity, a mixture of a solid electrolyte and an electrolyte solution, or a mixture of a solid electrolyte and a gel electrolyte can be cited.

As a solid electrolyte, for example, a polymer solid electrolyte wherein an electrolytic salt is dispersed in a polymeric material having ion conductivity, or an inorganic solid electrolyte comprised of ion conducting glass or ionic crystal can be used. Here, as a polymeric material, for example, an ether high polymer compound such as polyethylene oxide or a cross-linked polymer including polyethylene oxide, an ester high polymer compound such as polymethacrylate, and an acrylate high polymer compound can be used individually, by mixing them, or by copolymerisation in molecules. As the inorganic solid electrolyte, lithium nitride, lithium phosphate or the like can be used.

In the foregoing embodiment and Examples, the layer including silicon oxide 22C is provided on the anode active material layer 22B. However, the layer including silicon oxide can be located on the cathode side of the anode active material layer, and for example, other layer can be inserted between the anode active material layer and the layer including silicon oxide.

Further, in the foregoing embodiment and Examples, the anode active material layer 22B is formed on the anode collector 22A. However, other layer can be formed between the anode collector and the anode active material layer.

In addition, in the foregoing embodiment and Examples, the winding laminated type secondary battery has been described. However, the invention can be applied similarly to a multilayer laminated type secondary battery. In addition, the invention can be applied to secondary batteries of cylinder type, square type, coin type, button type, thin type, large type and the like. In these cases, instead of the film exterior member, an iron can or an aluminum can be used. Further, the invention can be applied not only to the secondary batteries, but also to primary batteries.

As described above, according to the anode of an embodiment of the invention, and the battery of the invention, the layer including silicon oxide having a thickness of about 50 nm or more is provided on the anode active material layer. Therefore, reaction between the anode active material layer and the electrolyte can be inhibited at high temperature, and rise of internal resistance and lowering of capacity of the battery can be prevented. Namely, superior hot holding characteristics can be obtained.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An anode, comprising:
   an anode collector;
   a first layer including anode active material which is provided on the anode collector, and which is alloyed with the anode collector on at least a portion of interface between the first layer and the anode collector, wherein the anode active material includes at least one type of compounds of silicon; and
   a second layer including silicon oxide having a thickness of about 50 nm to about 300 nm wherein the second layer is provided on the first layer.

2. An anode, comprising:
   an anode collector;
   a first layer including anode active material which is formed on the anode collector by at least one method selected from the group consisting of a vapor-phase method, a liquid phase method, and a sinter method, wherein the anode active material includes at least one type of compounds of silicon; and
   a second layer including silicon oxide having a thickness of about 50 nm to about 300 nm wherein the second layer is provided on the first layer.

3. The anode according to claim 2, wherein the first layer is alloyed with the anode collector on at least a portion of interface between the anode active material layer and the anode collector.

4. The anode according to claim 2, wherein the first layer includes at least one type of a simple substance and compounds of silicon (Si).

5. The anode according to claim 2, wherein the second layer including silicon oxide includes silicon dioxide.

6. A battery, comprising a cathode, an anode, and an electrolyte; wherein
the anode comprises an anode collector, a first layer including anode active material which is provided on the anode collector, and which is alloyed with the anode collector on at least a portion of interface between the first layer and the anode collector, wherein the anode active material includes at least one type of compounds of silicon, and a second layer including silicon oxide having a thickness of about 50 nm to about 300 nm which is provided on the first layer.

7. A battery, comprising a cathode, an anode, and an electrolyte; wherein
the anode comprises an anode collector, a first layer including anode active material which is formed on the anode collector by at least one method selected from the group consisting of a vapor-phase method, a liquid phase method, and a sinter method, wherein the anode active material includes at least one type of compounds of silicon, and a second layer including silicon oxide having a thickness of about 50 nm to about 300 nm wherein the second layer is provided on the first layer.

8. The battery according to claim 7, wherein the first layer is alloyed with the anode collector on at least portion of interface between the first and the anode collector.

9. The battery according to claim 7, wherein the first layer includes at least one type of a simple substance and compounds of silicon (Si).

10. The battery according to claim 7, wherein the second layer including silicon oxide includes silicon dioxide.

11. The battery according to claim 7, wherein the electrolyte includes a holding body, a solvent, and an electrolytic salt.

12. The battery according to claim 7, further comprising one or more film exterior members that house the cathode, the anode, and the electrolyte.

13. The battery according to claim 7, wherein the cathode contains a metal complex oxide including lithium.

* * * * *